United States Patent
Kato et al.

(10) Patent No.: US 7,904,724 B2
(45) Date of Patent: Mar. 8, 2011

(54) TRANSLATION DEVICE, TRANSLATION METHOD, AND STORAGE MEDIUM

(75) Inventors: Masahiro Kato, Ashigarakami-gun (JP); Hiroaki Ikegami, Ashigarakami-gun (JP); Katsuhiko Itonori, Ashigarakami-gun (JP); Masanori Onda, Ashigarakami-gun (JP); Hideaki Ashikaga, Ashigarakami-gun (JP); Shunichi Kimura, Ashigarakami-gun (JP); Masanori Satake, Ebina (JP); Hiroki Yoshimura, Ashigarakami-gun (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1130 days.

(21) Appl. No.: 11/211,762

(22) Filed: Aug. 26, 2005

(65) Prior Publication Data

US 2006/0215211 A1  Sep. 28, 2006

(30) Foreign Application Priority Data

Mar. 25, 2005  (JP) .................................. 2005-090198

(51) Int. Cl.
*H04L 9/00* (2006.01)
*H04N 1/44* (2006.01)
(52) U.S. Cl. .......................... 713/176; 713/181; 380/243
(58) Field of Classification Search .................. None
See application file for complete search history.

(56) References Cited

U.S. PATENT DOCUMENTS

| 5,606,609 | A | * | 2/1997 | Houser et al. ................. 713/179 |
| 6,366,697 | B1 | * | 4/2002 | Goldberg et al. ............. 382/186 |
| 6,581,066 | B1 | * | 6/2003 | Wang Baldonado et al. ......... 1/1 |
| 6,750,985 | B2 | * | 6/2004 | Rhoads ........................ 358/3.28 |
| 7,100,050 | B1 | * | 8/2006 | Coppersmith et al. ........ 713/176 |
| 7,197,644 | B2 | * | 3/2007 | Brewington .................. 713/176 |
| 7,389,420 | B2 | * | 6/2008 | Tian ............................. 713/176 |
| 2005/0221856 | A1 | | 10/2005 | Hirano et al. |
| 2007/0244693 | A1 | * | 10/2007 | Atallah et al. .................... 704/9 |

FOREIGN PATENT DOCUMENTS

| JP | A 5-336357 | 12/1993 |
| JP | A-11-122485 | 4/1999 |
| JP | A-2003-069803 | 3/2003 |
| JP | A-2003-122751 | 4/2003 |
| JP | A-2003-178067 | 6/2003 |

OTHER PUBLICATIONS

Aug. 25, 2009 Office Action issued in Japanese patent application No. 2005-090198 (with translation).

* cited by examiner

*Primary Examiner* — Kaveh Abrishamkar
(74) *Attorney, Agent, or Firm* — Oliff & Berridge, PLC

(57) ABSTRACT

A translation device has an input unit that inputs image data from a document; a detecting unit that detects a security information image, which indicates that the inputted image is a confidential image, from the inputted image data; a translating unit that translates the security information image detected by the detecting unit; and an outputting unit that outputs the translated image of the security information image.

15 Claims, 4 Drawing Sheets

| | SECURITY MARK | TRANSLATION |
|---|---|---|
| 1 | 秘密 | Secret |
| 2 | 秘 | |
| 3 | 極秘 | Top Secret |
| ... | ... | ... |
| ⋮ | ⋮ | ⋮ |

顧客の個人貯蓄情報
Aさん 12,500,000 円
Bさん 137,000,000 円
Cさん 1,300,000 円
Dさん 45,000 円
⋮

顧客の個人貯蓄情報
Aさん 12,500,000 円
Bさん 137,000,000 円
Cさん 1,300,000 円
Dさん 45,000 円
⋮

PRIVATE BANK DETAILS
OF ALL OF OUR CLIENTS
(IN JP YEN)
MR. A 12,500,000
MS. B 137,000,000
MS. C 1,300,000
MR. D 45,000
⋮

PRIVATE BANK DETAILS
OF ALL OF OUR CLIENTS
(IN JP YEN)
MR. A 12,500,000
MS. B 137,000,000
MS. C 1,300,000
MR. D 45,000
⋮

TRANSLATION DEVICE, TRANSLATION METHOD, AND STORAGE MEDIUM

BACKGROUND OF THE INVENTION

1. Field of the Invention

The present invention relates to a method, a device and a storage medium for translation of a document from one language to another language.

2. Descriptions of the Related Art

A copy of a document may be easily produced using a conventional photocopier, regardless of whether the document contains confidential information. Accordingly, photocopying may easily be used to leak confidential information.

A translation device is adapted to translate a document from one language to another language; whereby the translation device will not produce a translation of a document if the document is stamped with a red mark.

However, such a translation device causes a problem; for example, in a case that a native speaker of English who is not able to understand Japanese tries to translate a Japanese document into English using the translation device. According to the above related art, s/he will be unable to obtain an English translation of a document stamped with a red mark. In such a situation, the user may be unable to ascertain the reason for being unable to obtain the translation, since s/he may not understand Japanese words included in the stamped red mark, such as 'No Copy'.

SUMMARY OF THE INVENTION

The present invention has been made in view of the above circumstances and provides a translation device, including: an input unit that inputs image data from a document; a detecting unit that detects a security information image, which indicates that the inputted image is a confidential image, from the inputted image data; a translating unit that translates the security information image detected by the detecting unit; and an outputting unit that outputs the translated image of the security information image.

BRIEF DESCRIPTION OF THE DRAWINGS

Embodiments of the present invention will be described in detail based on the following figures, wherein.

DETAILED DESCRIPTION OF THE INVENTION

A. Configuration

Translation device 1 is adapted to translate a document to a target language, and is adapted to generate a copy of the translated document.

Figure 1:
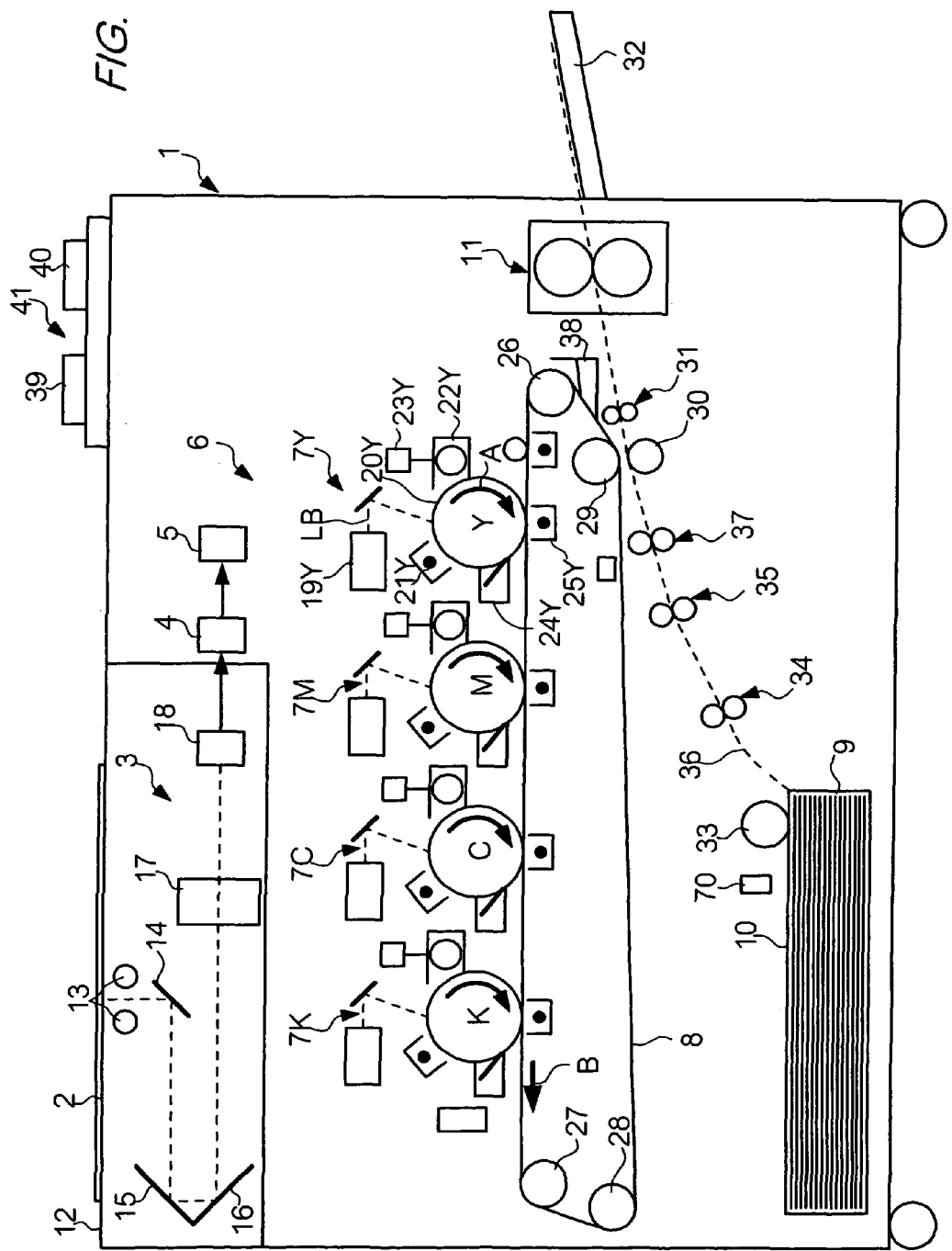
FIG. 1 illustrates a hardware configuration of translation device 1.

FIG. 1 illustrates a hardware configuration of translation device 1. Translation device 1 has a control unit 4. Control unit 4 includes a CPU (Central Processing Unit), a ROM (Read Only Memory), and a RAM (Random Access Memory), which are not shown in FIG. 1. CPU executes OS (Operating System) programs stored in ROM to control components of translation device 1.

Storage unit 5 is non-volatile, and is configured as a hard disk drive unit or the like. Storage unit 5 stores dictionary 51 including a set of words and their corresponding meanings in plural languages. Storage unit 5 also stores computer programs for performing operations, such as inputting, translating, and outputting a document.

Instruction input unit 41 has a keyboard 40 with a ten keypad and a start button, and has a display unit 39 including an LCD panel with a touch panel function. A user may input instructions to translation device 1 via instruction input unit 41. In case of malfunction of translation device 1, a status of translation device 1 may be displayed at display unit 39.

Sheets 10 adapted to have images formed thereon are stacked on paper feed tray 9. When an instruction to form images on a sheet 10 is input via instruction input unit 41, paper feed roller 33 starts rotating, and feeds sheets 10 one-by-one from paper feed tray 9. Sheets 10 are conveyed along conveyance path 36 by means of paired rollers 34, 35, 37.

Image input unit 12 inputs a document optically, and generates image data.

Image input unit 12 may be configured as a scanning unit. More specifically, light is radiated from light source 13 onto a document put on platen glass 2. Light from the document is reflected via mirrors 14, 15, 16 and received by light reception unit 17. Image processing unit 18 converts the reflected light received by light reception unit 17 to electric signals, so as to generate image data consisting of colors of Yellow (Y), Magenta (M), Cyan (C), and Black (B).

Image forming unit 6 has image forming mechanisms 7Y, 7M, 7C, 7K, and a transferring belt 8.

Image forming mechanisms 7Y, 7M, 7C, 7K each form toner images of a single color of Yellow, Magenta, Cyan and Black, respectively. Since these image forming mechanisms have identical configurations, only the details of image forming mechanism 7Y will be described.

Image forming mechanism 7Y includes a photoconductive drum 20Y (image support member), on which an electro-static latent image is formed, and by which toner image is supported. Image forming mechanism 7Y also includes an electro-static charging unit 21Y, an exposure unit 19Y, a development unit 22Y, and a cleaning unit 24Y around photoconductive drum 20Y.

Electro-static charging unit 21Y uniformly charges the whole surface of photoconductive drum 20Y to a certain electric potential level of a uniform polarity, while photoconductive drum 20Y is rotating in a direction of arrow A.

Exposure unit 19Y radiates a beam of light onto the surface of photoconductive drum 20Y in accordance with image data.

Exposure unit 19Y may be configured as a Raster Output Scanner. More specifically, exposure unit 19Y scans a laser beam emitted from a semiconductor laser unit (not shown) in accordance with image data, so as to form an electro-static latent image on the surface of photoconductive drum 20Y. After the laser beam is radiated on an area of the surface of photoconductive drum 20Y, the electric potential level of the area reduces in accordance with the intensity of the laser beam_due to photoconductivity of photoconductive drum 20Y. Thus, an electro-static latent image corresponding to the image data is formed on the surface of photoconductive drum 20Y.

Development unit 22Y develops the electro-static latent image formed on the surface of photoconductive drum 20Y. More specifically, toner (electro-statically charged color pigmental material) is charged with the same polarity as the surface of photoconductive drum 20Y. Then, toner is fed from toner tank 23Y to the surface of photoconductive drum 20Y, so as to generate a toner image on the surface of photoconductive drum 20Y. Thus, a toner image, which is a negative image of the electrostatic latent image, is formed on the surface of photoconductive drum 20Y.

Transferring belt 8 is hung on rollers 26, 27, 28, 29, and is driven rotatingly in the direction of arrow B. Transferring belt 8 runs below photoconductive drum 20Y. When photoconductive drum 20Y is pressed against transferring belt 8, the toner image formed on the photoconductive drum 20Y is transferred to transferring belt 8.

Cleaning unit 24Y removes residual toner from photoconductive drum 20Y.

Similarly, in image forming mechanisms 7M, 7C, 7K, a toner image of each color is formed on photoconductive drum 20M, 20C, 20K, respectively. The toner image of each color is overlappingly transferred to transferring belt 8, successively.

Where it is not necessary to distinguish between image forming mechanisms 7Y, 7M, 7C, 7K, they are simply collectively referred to as image forming mechanism 7. Similarly, where it is not necessary to distinguish between colors for other components, the notations Y, M, C, K will also be omitted.

After sheet 10 is fed from paper feed tray 9 on conveyance path 36, sheet 10 enters the nip portion formed between transferring belt 8 and transfer roller 30, and is pressed against transferring belt 8. The pressing force and electro-static suction force from sheet 10 causes the toner image to be transferred onto the surface of sheet 10.

After that, sheet 10 is guided into fusing unit 11 by paired roller 31, and fusing unit 11 presses and heats sheet 10 so that the toner is fused on the surface of sheet 10. Thus, an image is formed on sheet 10, and sheet 10 is ejected out to catch tray 32.

B. Functions

Figure 2:
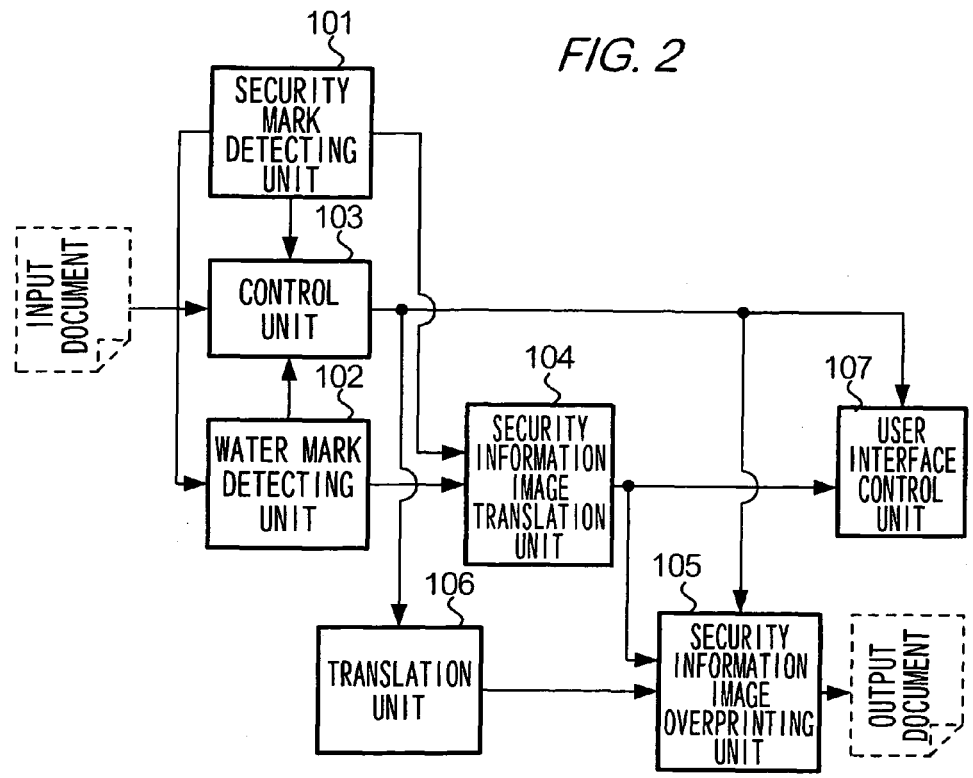
FIG. 2 illustrates a functional block diagram of translation device 1.

FIG. 2 illustrates a functional block diagram of translation device 1. CPU executes programs stored in storage unit 5 to perform translation functions.

In the present embodiment, a security information image is used with a document to indicate that the document includes confidential information or that the document should be handled in a restricted manner. More specifically, two types of security information images are used in the present embodiment.

Figures 6A, 6B, 6C, 6D, 7:
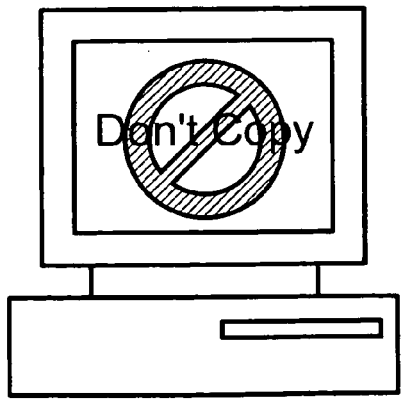
FIGS. 6A and 6B illustrate examples of documents overprinted with security information images.
FIGS. 6C, and 6D illustrate examples of translated documents overprinted with translations of security information images.
FIG. 7 illustrates an example of displaying a security information image.

The first type of security information image is a security mark overprinted on a document. An example of a security mark is illustrated in FIG. 6B. In the present example, the security mark is composed of the Japanese character '秘 (confidential)' and an open circle, and the security mark denotes that the document is confidential. In a typical case, a security mark is overprinted or stamped on a document in red ink. Security mark detecting unit 101 detects a security mark in a document by matching the image data with security marks stored in storage unit 5.

The second type of security information image is a watermark overprinted on a document. The watermark is defined in the present embodiment as a series of characters overprinted on a text body of a document. An example of a watermark is illustrated in FIG. 6a. In the present example, the watermark is the Japanese term '秘密 (confidential)'. In another example, the Japanese term '複写禁止 (No Copy)' is overprinted on a document, to denote that the document is restricted from photocopying.

Watermark detecting unit 102 detects a watermark in a document. More specifically, in a typical case, characters composing a watermark are printed in a paler color and/or with a smaller size of typeface than the characters of the text body, so that the watermark can be viewed by a user from a distance of several tens of centimeters. Accordingly, watermark detecting unit 102 filters image data with a low-pass spatial filter, so as to extract from the image data structures having a smaller spatial frequency than a threshold frequency remaining after the filtering. Watermark detecting unit 102 then detects a watermark composed of characters having a paler color than a prescribed level or characters having a larger size of typeface than characters of the text body.

Control unit 103 controls operations of other components in translation device 1, in accordance with the security information image (a security mark or a watermark) detected by security mark detecting unit 101 or watermark detecting unit 102. More specifically, when security mark detecting unit 101 or watermark detecting unit 102 detects a security information image in a document, control unit 103 reads from storage unit 5 an instruction corresponding to the detected security information image.

Storage unit 5 stores security information images and their corresponding instructions.

In one example, when the type of a security information image is a watermark, the instruction is composed of translating the security information image to a target language, and overprinting the translation of the security information image on the translation of the text body of the document.

In the second example, when the type of security information image is a security mark, the instruction is composed of translating the characters in the security information image to a target language so as to translate the security information image, and overprinting the translation of the security information image on the translation of the text body of the document.

In the third example, when the security information image indicates that the document is restricted from photocopying, the instruction is composed of translating the security information image, displaying the translation of the security information image at display unit 39, and performing no translation of the text body of the document.

Security information image translation unit 104 selects from dictionary 51 a translation of security information image detected by security mark detecting unit 101 or watermark detecting unit 102.

Translation unit 106 generates a translation of characters in the text body of the document by recognizing the characters, and translating the recognized characters to a target language. More specifically, translation unit 106 uses, for example, known syntax and semantic analysis approaches to analyze syntax of a document, generates a syntax tree and converts the generated syntax tree to a target language. Translation unit 106 selects a translation of each morpheme to generate a translation of the document.

Security information image overprinting unit 105 overprints the translation of the security information image selected by translation unit 104 on the translation of the document generated by translation unit 106. Security information image overprinting unit 105 overprints the translation of the security information image either as a watermark or as a security mark.

User Interface control unit 107 displays the translation of the security information image selected by security information image translation unit 104 on display unit 39.

C. Operations

Figure 3:
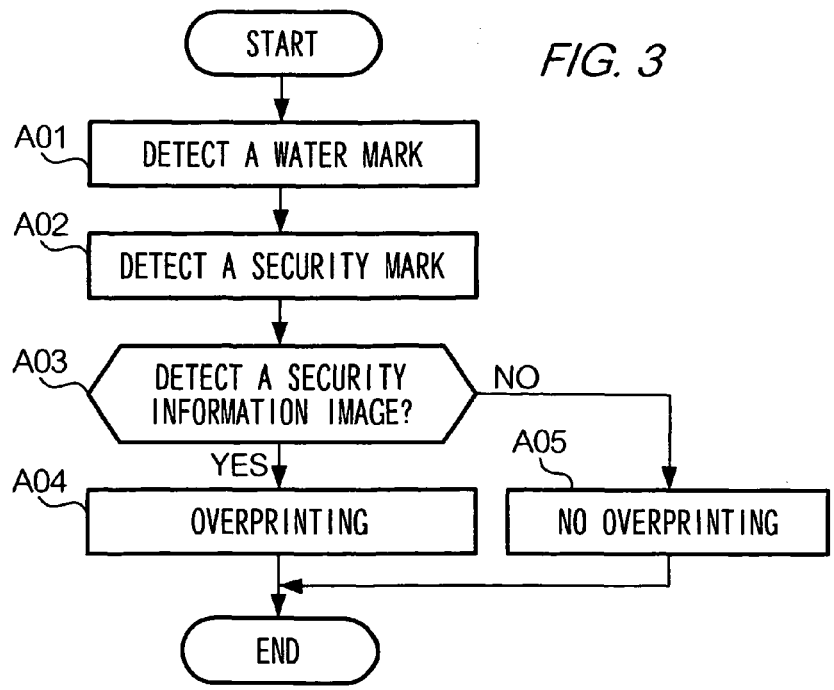
FIGS. 3 and 4 illustrate operational flows of translation device 1.

FIG. 3 illustrates an operational flow of translation device 1 according to the present embodiment. In FIG. 3, it is assumed that translation device 1 has already been powered on and CPU is running computer programs. In the following, translation of a document from Japanese to English will be described.

A paper document (referred to hereinafter as a document) is placed face down on platen glass 2. When a start button is pressed at instruction input unit 41, image input unit 12 generates image data of the document and stores the image data in storage unit 5.

In step A01, CPU detects a watermark by using watermark detecting unit 102. In step A02, CPU detects a security mark by using security mark detecting unit 101.

In step A03, CPU determines whether a security information image is detected in a document in step A01 or A02. If a security information image is detected (step A03: YES), CPU advances its operation to step A04, and performs its operation according to the security information image detected. CPU forms an output image of the translated document overprinted as illustrated in FIG. 6C or 6D on the surface of a sheet by using image forming unit 6. Finally, the sheet is ejected out to catch tray 32.

If no security information image is detected (step A03: NO), CPU moves to step A05, and performs full translation of the document. CPU forms an output image of the translation of the document on the surface of a sheet by using image forming unit 6. Finally, the sheet is ejected out to catch tray 32.

In the case that a watermark is overprinted on a document as illustrated in FIG. 6A, a Japanese term included in the watermark and the text body of the document are translated to English, and the translation of the term included in the watermark is overprinted on the English translation of the text body of the document, as illustrated in FIG. 6C.

In the case that a security mark is overprinted on a document as illustrated in FIG. 6B, a Japanese term included in the security mark and the text body of the document are translated to English, and the translation of the term included in the security mark is overprinted on the English translation of the text body of the document, as illustrated in FIG. 6D.

If the security information image '複写禁止' is detected by watermark detection unit 101 or security mark detection unit 102, it is translated to the corresponding English term, 'No Copy', and the translation 'No Copy' may be displayed at display unit 39, as illustrated in FIG. 7.

Various operations may be performed according to a security information image.

To summarize, a security information image in a document is detected. The detected security information image is translated to a target language. The translation of the security information image is output together with the translation of the text body of the document or is displayed separately, in accordance with the security information image. Thus, a user may understand the meaning of a security information image from its translation.

D. Modifications

A type of security information image overprinted on a document, and a location of overprinting may be selected by a user.

Figures 4, 5:
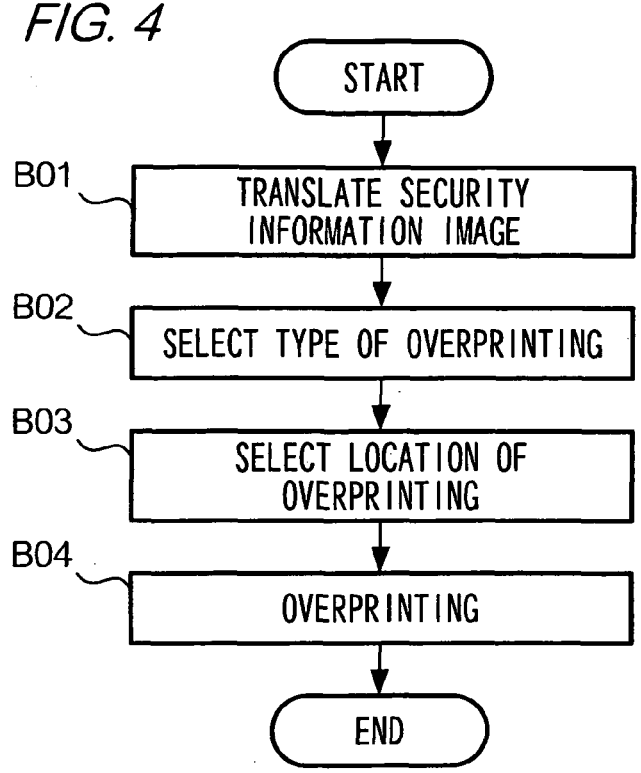
FIG. 5 illustrates an example of a translation table.

FIG. 4 illustrates another operational flow of translation device 1.

In step B01, CPU translates the security information image by using security information image translation unit 104. In step B02, CPU displays at display unit 39 a screen for selecting a type of security information image. For example, a menu composed of two selections: 'watermark', and 'security mark' are displayed at display unit 39. In step B03, CPU displays a screen for selecting a location of overprinting on a document at display unit 39. For example, the location of overprinting is set and adjusted by a movement of a pointing device such as a pointing-mouse in a rectangular image representing an outline of a paper document. In step B04, the translation of security information image is overprinted on a translation of a text body in the selected type of security information image at the selected location of overprinting.

Security marks may be stored in a translation table, as illustrated in FIG. 5.

The translation of the security information image may be converted to a voice and output from a speaker, so as to notify a user of the security information image.

Image input unit 12 may be a separate scanning device connected to translation device 1 via a network. Image forming unit 6 may be a separate printing device connected to translation device 1 via a network.

As described above, the present invention provides a translation device, including: an input unit that inputs image data from a document; a detecting unit that detects a security information image, which indicates that the inputted image is a confidential image, from the inputted image data; a translating unit that translates the security information image detected by the detecting unit; and an outputting unit that outputs the translated image of the security information image.

The present invention provides a translation method, including: inputting image data from a document; detecting a security information image, which indicates that the inputted image is a confidential image, from the inputted image data; translating the security information image detected; and outputting the translated image of the security information image.

The present invention further provides a storage medium readable by a computer, the storage medium storing a program of instructions executable by the computer to perform a function, the function including: inputting image data from a document; detecting a security information image, which indicates that the inputted image is a confidential image, from the inputted image data; translating the security information image detected; and outputting the translated image of the security information image.

Accordingly, a security information image is detected in a document; the security information image is translated to a target language; and the translation of the security information image is output.

Thus, a user may figure out the security information image included in the document from the translation of the security information image.

The foregoing description of the embodiments and modifications of the present invention has been provided for the purpose of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the various embodiments of the invention and the various modifications as are suited to the particular use contemplated. It is intended that the scope of the invention be defined by the following claims and their equivalents.

The entire disclosure of Japanese Patent Application No. 2005-90198 filed on Mar. 25, 2005, including specification, claims, drawings, and abstract is incorporated by reference.

What is claimed is:

1. A translation device, comprising:
    an input unit that inputs image data from a document;
    a detecting unit that detects a security mark on the document, which indicates that the inputted image is a confidential image, from the inputted image data;
    a document translating unit that translates the image data composed of a natural language from the document input by the input unit into a target natural language;
    a security mark translating unit that translates the security mark detected by the detecting unit into the target natural language;
    an outputting unit that outputs an output image composed of a translated document and a translated image of the security mark overprinted on the translated document at a location selected by a user;
    a memory that stores a relation between a content of the security mark and an instruction; and
    a controller that selects the instruction stored in the memory corresponding to the security mark detected by the detecting unit, and performs operations in accordance with the selected instruction.

2. The translation device according to claim 1, further comprising:
    an image forming unit that forms an output image on a recording medium,
    wherein the controller causes the image forming unit to form an output image on the recording medium according to the selected instruction, the output image being composed of a translation of a text body of a document, and the translation of the security information image overprinted on the text body of the document.

3. The translation device according to claim 1, further comprising:
    an image forming unit that forms an output image on a recording medium,
    wherein the controller causes the image forming means to form an output image on the recording medium according to the selected instruction, the output image being composed of the translation of the security information image.

4. The translation device according to claim 1, further comprising:
    a notifying unit that notifies the translation of the security information translated by the translating unit.

5. The translation device according to claim 1,
    wherein if no security information is detected by the detecting unit, the controller causes the image forming unit to form an output image on the recording medium, the output image being composed of a translation of a text body of a document translated by the translation unit.

6. The translation device according to claim 1, further comprising a display with a touch panel function that displays a screen for selecting a location of overprinting on the document,
    wherein the translated image of the security mark is overprinted on the translated document at the location selected by the user using the display.

7. The translation device according to claim 1, further comprising a memory that stores a translation table including a security mark and a security mark translated into the target natural language,
    wherein the security mark translating unit retrieves from the memory the translated security mark corresponding to the security mark detected by the detecting unit.

8. A translation method, comprising:
    inputting image data from a document;
    detecting a security mark on the document, which indicates that the inputted image is a confidential image, from the inputted image data, wherein the detecting of the security mark is performed by a processor;
    translating the input image data composed of a natural language from the document into a target natural language;
    translating the detected security mark into the target natural language;
    outputting an output image composed of a translated document and a translated image of the security mark overprinted on the translated document at a location selected by a user; wherein
    a relation between a content of the security information image and an instruction is stored;
    an instruction is selected, which is stored in the memory corresponding to the security information image detected; and
    operations are performed in accordance with the selected instruction.

9. The translation method according to claim 8, wherein
    an output image is formed on a recording medium according to the selected instruction; and
    the output image is composed of a translation of a text body of a document and the translation of the security information image overprinted on the text body of the document.

10. The translation method according to claim 8, further comprising displaying a screen for selecting a location of overprinting on the document,
    wherein the translated image of the security mark is overprinted on the translated document at the location selected on the screen by the user.

11. The translation method according to claim 8, further comprising storing in a memory a translation table including a security mark and a security mark translated into the target natural language,
    wherein the translated security mark corresponding to the security mark detected by the detecting unit is retrieved from the memory.

12. A non-transitory storage medium readable by a computer, the storage medium storing a program of instructions executable by the computer to perform a function, the function comprising:
    inputting image data from a document;
    detecting a security mark on the document, which indicates that the inputted image is a confidential image, from the inputted image data;
    translating the input image data composed of a natural language from the document into a target natural language;
    translating the detected security mark into the target natural language;
    outputting an output image composed of a translated document and a translated image of the security mark overprinted on the translated document at a location selected by the user; wherein a relation between a content of the security information image and an instruction is stored;

an instruction is selected, which is stored in the memory corresponding to the security information image detected; and operations are performed in accordance with the selected instruction.

13. The storage medium readable by a computer according to claim 12, wherein an output image is formed on a recording medium according to the selected instruction; and the output image is composed of a translation of a text body of a document and the translation of the security information image overprinted on the text body of the document.

14. The storage medium readable by a computer according to claim 12, further comprising displaying a screen for selecting a location of overprinting on the document, wherein the translated image of the security mark is overprinted on the translated document at the location selected on the screen by the user.

15. The storage medium readable by a computer according to claim 12, further comprising storing in a memory a translation table including a security mark and a security mark translated into the target natural language, wherein the translated security mark corresponding to the security mark detected by the detecting unit is retrieved from the memory.

\* \* \* \* \*